(12) United States Patent
Garland et al.

(10) Patent No.: US 6,614,802 B1
(45) Date of Patent: Sep. 2, 2003

(54) TELECOMMUNICATION NETWORK WITH REMOTELY CONTROLLABLE, LINE MULTI-INTERFACE AND TELECOMMUNICATION METHOD

(75) Inventors: Stuart M. Garland, Morton Grove; David B. Smith, Hinsdale, both of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/233,163

(22) Filed: Jan. 18, 1999

(51) Int. Cl.[7] .................................................. H04J 3/16
(52) U.S. Cl. ...................... 370/465; 370/353; 370/355; 370/356; 370/401; 370/493
(58) Field of Search ................................ 370/352, 353, 370/355, 356, 401, 402, 465, 466, 492, 493, 494, 495, 360; 379/106.03, 106.06; 340/870.02, 870.03

(56) References Cited

U.S. PATENT DOCUMENTS

| | | | | |
|---|---|---|---|---|
| 5,526,416 A | * | 6/1996 | Dezonno et al. | 379/265 |
| 5,559,794 A | * | 9/1996 | Willis et al. | 370/58.3 |
| 5,995,601 A | * | 11/1999 | Garland et al. | 340/870.02 |
| 6,169,742 B1 | * | 1/2001 | Chow et al. | 370/402 |

* cited by examiner

Primary Examiner—Douglas Olms
Assistant Examiner—Shick Hom
(74) Attorney, Agent, or Firm—Grossman, Patti & Brill

(57) ABSTRACT

A telecommunication network with a local multi-interfacing multiport switch with a remotely controllable line multi-interface for alternatively, selectively, connecting different line unit interfaces to a single customer line to enable both digital and analog communication on a single line.

14 Claims, 4 Drawing Sheets

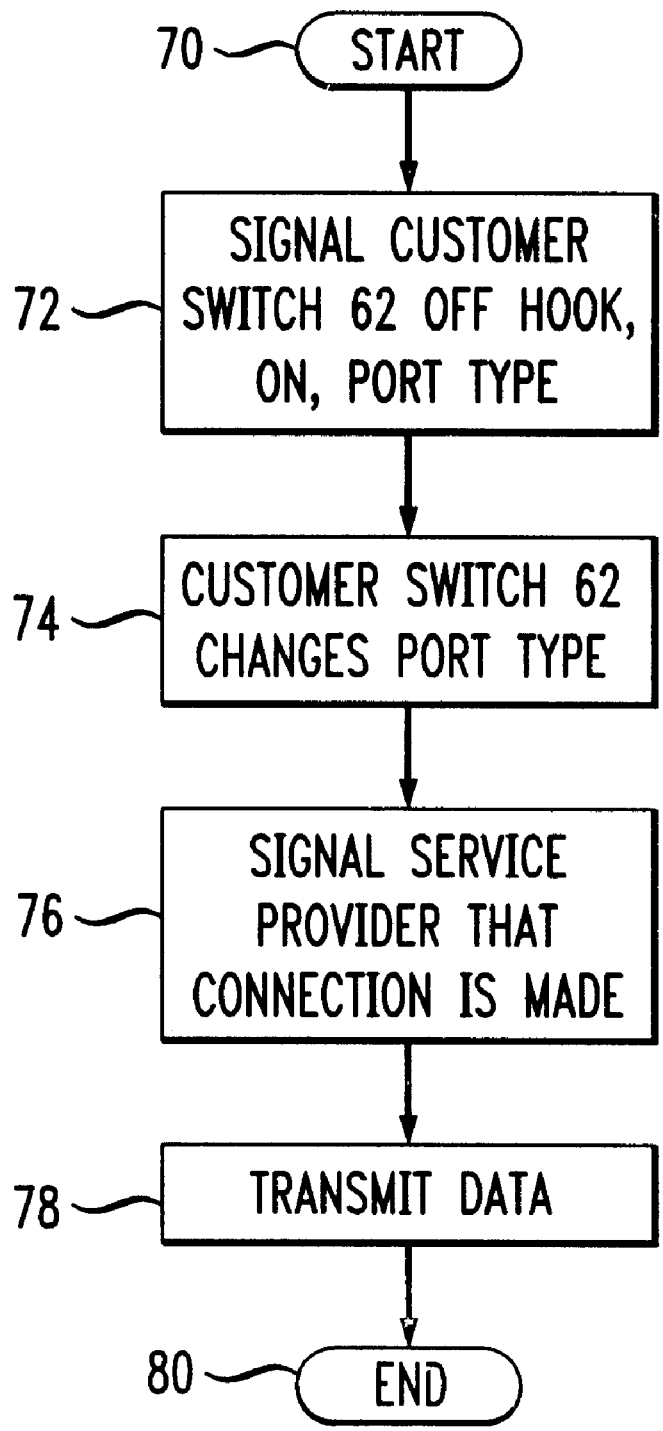

TELECOMMUNICATION NETWORK WITH REMOTELY CONTROLLABLE, LINE MULTI-INTERFACE AND TELECOMMUNICATION METHOD

BACKGROUND OF THE INVENTION

This invention relates to a telecommunication network and method and, more particularly, to a telecommunication network and method in which different types of telecommunication signaling are employed.

Known telecommunication networks include local multiport switches that service a plurality of individual telecommunication lines, or customer lines, to which are connected customer's telephones, facsimile communication systems, security systems, cable television converters and the like. More recently, utility service providers, such as local electric power, natural gas and water providers, are capable of accessing their usage meters located at the customer locations through the customer's telecommunication lines via a suppressed ringing protocol, such as described in U.S. Pat. No. 5,189,694 issued Feb. 23, 1993 to Garland for "Telemetry Access Arrangement" and U.S. Pat. 5,509,054 issued Apr. 16, 1996 to Garland for Communication Switching System". Both of these patents are hereby incorporated by reference with respect to such suppressed ringing and should also be referred to for general background on telephonic networks.

Disadvantageously, the known telecommunication networks are capable of providing all the above types of customer's telecommunication equipment and utility service provider's telemetering equipment, only if they all operate with the same type of telecommunication signals. If the different items of equipment do not operate with the same type of telecommunication signals then they cannot all be operated on the same customer line. Specifically, although the known networks provide both digital service in which digital signals are employed and, of course, the traditional analog service in which analog signals are employed, they do not provide both types of service on any single one of the lines during the same service periods.

Thus, for instance, it is not possible to have an analog telephone on the customer line while at the same time an automatic meter reading apparatus is on the same line that employs a digital signal format for communication on the line. Conversely, if automatic meter reading devices operate on an analog basis, should the customer change the telephone service on the line for digital service, then the automatic meter reading device will no longer be compatible with the now digital customer line and will no longer be able to communicate with the service provider. In such a circumstance, where the customer has both digital and analog telecommunication and telemetering equipment, the only recourse with the known networks is to provide two separate lines: one digital line and one analog line.

SUMMARY OF THE INVENTION

In accordance with the remotely controllable, line multi-interface capable telecommunications network and telecommunication method of the present invention, the aforementioned disadvantages of the known telecommunication network are overcome. Multiple interfaces are selected in the server without the need for activation by a telephone operating company.

In the preferred embodiment, a telecommunications network having a local multiport switch for servicing a plurality of telecommunication lines, is provided with a remotely controllable, line multi-interface, having a plurality of different line unit interfaces for interfacing different types of telecommunication signals, and means for selectively, alternatively, coupling the plurality of different line unit interfaces to at least a single one of the plurality of telecommunication lines to respectively enable communication via different types of telecommunication signals on the single one of the plurality of telecommunication lines. The plurality of different line unit interfaces includes an analog signal interface and a digital signal interface.

A special line unit switch electronically, alternatively, switches the single one of the plurality of telecommunication lines between the plurality of different line unit interfaces, and means at the multiport switch controls the special line unit switch in accordance with control messages sent to the multiport switch from, for instance, the utility service provider wanting to take a meter reading. After the call is completed, the special line unit switch automatically switches the single one of the telecommunication lines to a default one of the plurality of different line unit interfaces and does so otherwise in the absence of receipt of a control message indicating that another one of the plurality of different line unit interfaces is to be selected. Generally, a default one of the plurality of different line unit interfaces is selected as the active interface whenever another one of the plurality of different interfaces is not affirmatively selected to be the interface for the single one of the plurality of telecommunication lines. Alternatively, the single one of the telecommunication lines is selected for the majority of line accesses or they are selected by the "home" end user.

The default one of the plurality of different line unit interfaces is also automatically switched to the single one of the plurality of telecommunication lines initially when a call is originated from the single one of the plurality of telecommunication lines. The fault condition is defined by the end user customer, however, the multiport switch thereafter responds to receipt of an access code from the single one of the plurality of telecommunication lines to switch the single one of the plurality of telecommunication lines from the default one of the plurality of different line unit interfaces to another one of the plurality of different line unit interfaces.

In the preferred method of practicing the telecommunication method of the invention, use by at least one of the plurality of telecommunication lines of a plurality of different line unit interfaces for interfacing different types of telecommunication signals is provided and are selectively, alternatively, coupled to the plurality of different line unit interfaces to at least one of the plurality of telecommunication lines to respectively enable communication via the different types of telecommunication signals on the one

BRIEF DESCRIPTION OF THE DRAWINGS

The foregoing advantageous features will be explained in detail and further advantageous features of the invention will be made apparent from a reading of the detailed description of the preferred embodiment of the invention which is given with reference to the several figures of the drawing, in which:

FIG. 4 is a flow chart showing signaling which causes the customer's local switch to change to a specific line interface, such as default, analog, or ISDN.

DETAILED DESCRIPTION

Figure 1:
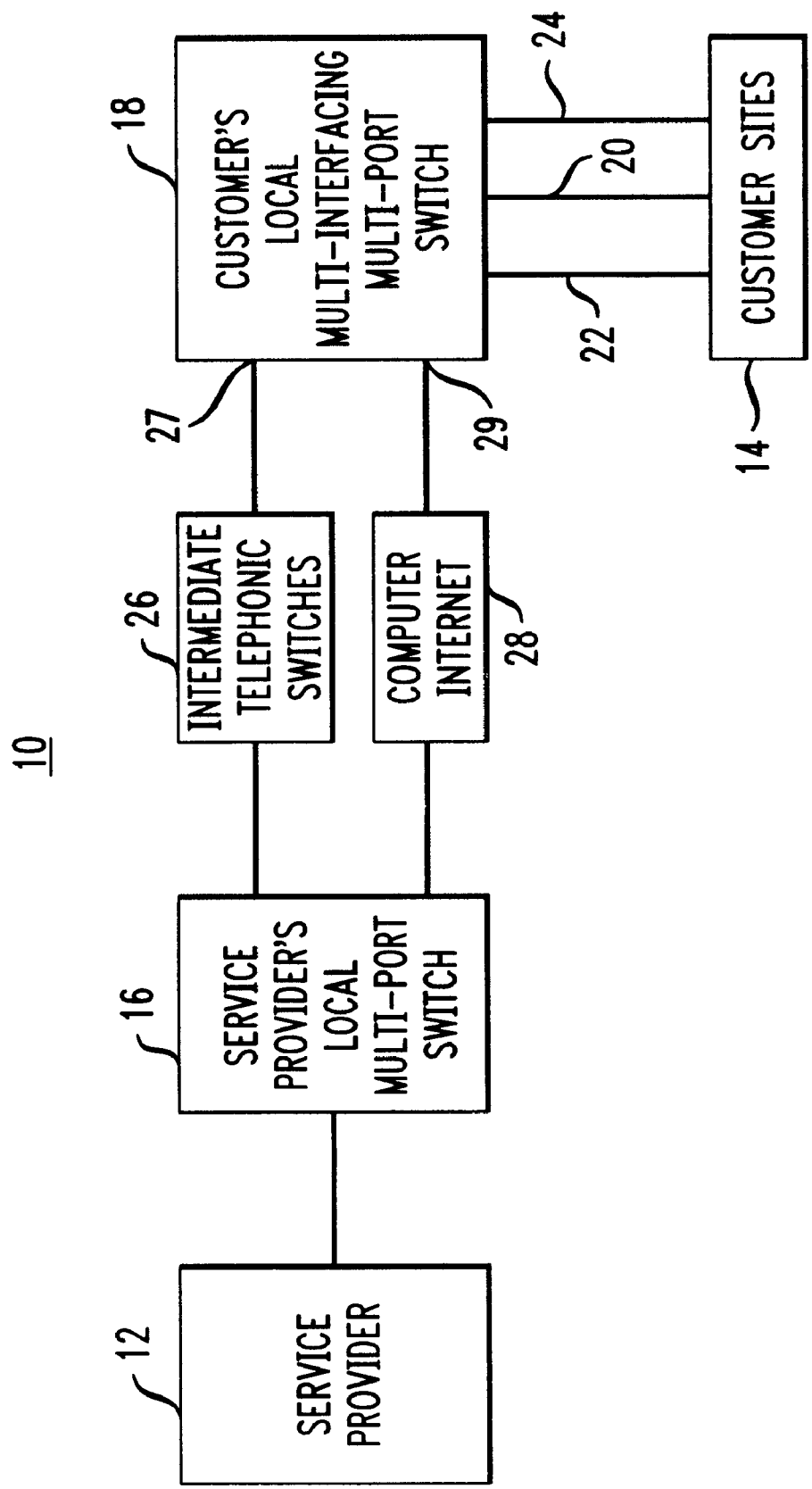
FIG. 1 is a functional block diagram of a preferred embodiment of the telecommunication network with the remotely controllable, line multi-interface of the present invention.

Referring to FIG. 1, the preferred embodiment of the telecommunication network with the remotely controllable, line multi-interface 10 of the present invention is shown with reference to a service provider 12, such as a natural gas or electrical service provider, communicating with their automatic meter reading equipment located at customer sites 14. The service provider 12 is connected with multiport, telephonic switch of the network 10 closest to the location of the service provider 12 which is referred to herein as the service provider's local, multiport switch, or service provider's switch, 16. Likewise, the multiport telephonic switch of the network 10 that is closest to the customer site or sites 14 under consideration is designated as the customer's local, multi-interfacing, multiport switch, or customer's local switch, 18. The customer's local switch, unlike conventional multiport switches is connected to the customer's equipment at the customer sites via at least some selectable digital/analog telecommunication lines as well as by conventional fixed digital lines 22 and conventional fixed analog lines 24. Alternatively and preferably, all of the lines of the selectable digital/analog lines.

In any event, the selectable digital/analog lines 20, under control of the customer's local switch and in response to messages from the service provider, are selectively, alternatively, operated as digital lines sometimes and operated as analog lines at other times. Preferably, the service provider's local switch 16 and the customer's local switch 18 are capable of being communication linked both conventionally by means of intermediate telephonic switches 26 at an input 27 and, preferably also via a service provider of a computer internet 28 coupled to an input 29, preferably the world wide web computer network, referred to as the internet. While only a representative one customer's local switch is shown for purposes of simplicity, it should be appreciated that in the preferred embodiment of the telecommunications network 10, there are a plurality of local multiport switches distributed around the service area of the network 10, and preferably all, or at least some, of the local multiport switches are multi-interfacing multiport switches substantially like the customer's local multi-interfacing multiport switch 18.

Figure 2:
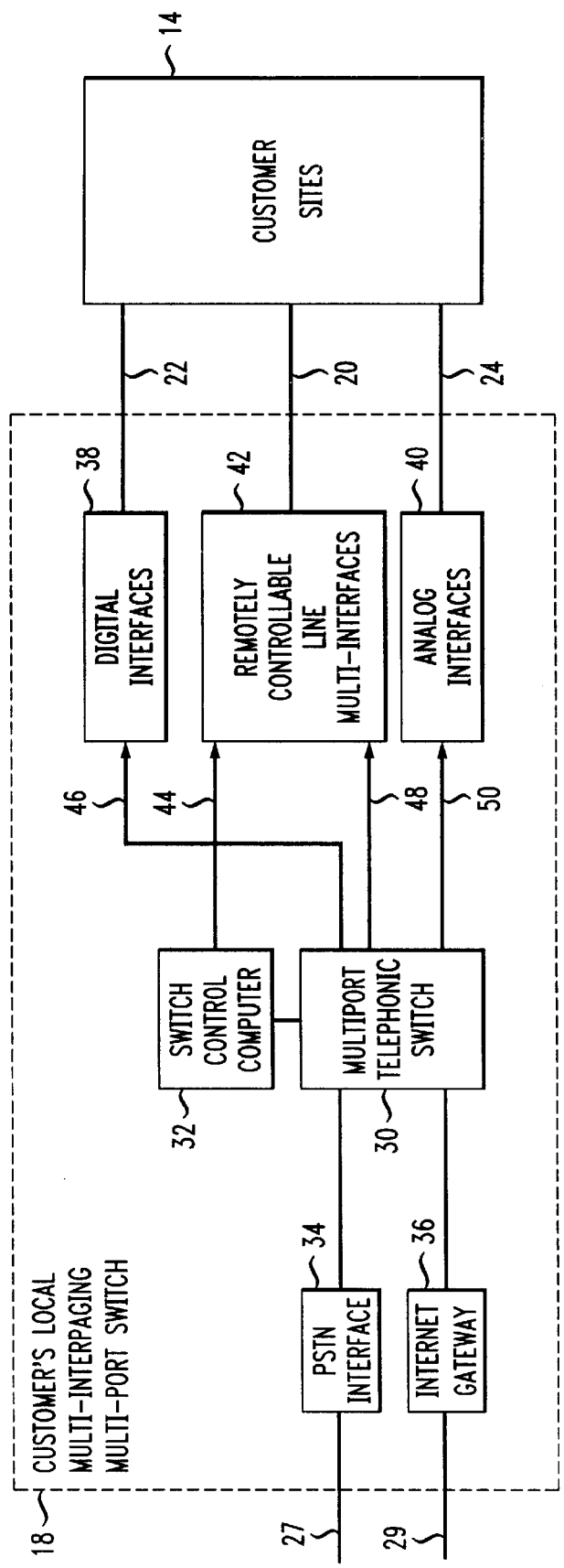
FIG. 2 is a detailed functional block diagram of the customer's local, multi-interfacing, multi-port switch previously shown only as a single functional block in FIG. 1.

Referring now to FIG. 2, the preferred embodiment of the customer's local, multi-interfacing, multiport switch 18, has a multi-port telephonic switch 30 that is controlled by a switch control computer 32. The telecommunication signals at 27 and 29 from the intermediate telephonic switches 26 and the computer Internet 28 are respectively applied to a PSTN interface 34 and an internet gateway switch, or internet gateway, 36 for open communications through the internet. For examples of protocols used for input to the multiport switch 18, see commonly owned U.S. Pat. No. 5,394,461, issued Feb. 28, 1995, to Garland entitled "Telemetry Feature Protocol Expansion" and U.S. Pat. No. 5,509,054, issued Apr. 16, 1996, to Garland entitled "Communication Switching System", the disclosures of which are incorporated by reference. The digital lines 22 are obtained from digital interface 38; the analog lines 24 are obtained from analog interface 40 and the selectable digital/analog lines 20 are obtained from a remotely controllable line multi-interface 42 of the present invention. The switch control computer 32 controls the remotely controllable line multi-interface via a control signal applied to an input 44. The multi-port telephonic switch 30 has pluralities of input/output, or I/O, line ports respectively coupled to switch I/O ports 46, 48 and 50 of the digital interface 38, the remotely controllable line multi-interface 42 and the analog interface 40. The digital interface 38 preferably includes a TI interface and a PRI interface.

Figure 3:
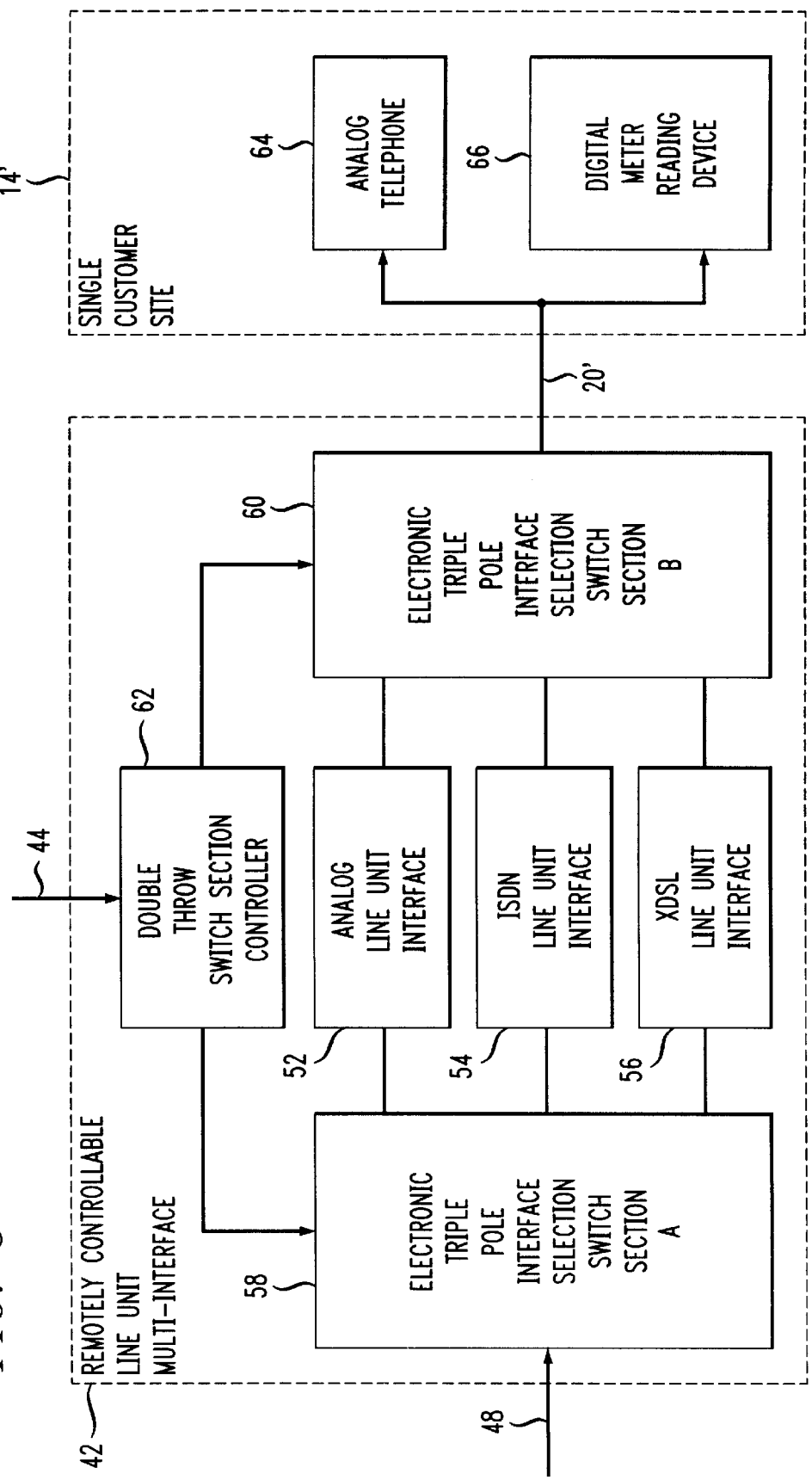
FIG. 3 is a functional block diagram of the remotely controllable multi-interface previously shown only as a single functional block is FIG. 2.

Referring to FIG. 3, the preferred embodiment of the remotely controllable line unit multi-interface 42 is shown with reference to a single customer site 14' as representative example of the plurality of customer sites having a dedicated single customer line 20' of the plurality of customer lines 20. The multi-interface includes three interfaces for interfacing different types of telecommunication signals between the multiport telephonic switch and the customer's equipment at the customer site: an analog line unit interface 52 for providing analog service on the selectable digital/analog lines, an ISDN line unit interface 54 for providing ISDN digital service for both voice and data and an XDSL line unit interface 56 for providing XSDL digital service. XDSL defines a set of Digital Subscriber Line (DSL) technologies over twisted pair copper local loop facilities. XDSL technologies are developed to increase the bandwidth over embedded copper loop plant and are primarily focused on data transport.

The plurality of interfaces 52, 54 and 56 are connected in parallel between the switch port 48 and the customer line 20' via a pair of substantially identical, electronic triple-pole switch sections 58 and 60, electronic triple-pole interface selection switch section A and electronic triple-pole interface selection switch section B, respectively. Switch sections 58 and 60 are both controlled by a double-throw switch section controller 62 to define an electronic triple-pole, double-throw switch. Both switch section 58 and 60 have three switch states, or switch positions, respectively associated with the analog line unit interface 52, the ISDN line unit interface 54 and the XDSL line unit interface 56. Other line interface types are also included, such as T1, PRI, and analog and digital (XDSL) interface types. When the switch sections 58 and 60 are both in the first, second and third switch positions, the line unit interfaces 52, 54 and 56 are connected in circuit between the I/O switch port 48 and the customers selectable digital/analog line 20' to interface the types of signals to which the particular interface is adapted. Only one of the plurality of line unit interfaces is selectable for connection at any one time, and when one of the plurality of line unit interfaces has been selected, then the other two interfaces are both disconnected from both the customer line 20' and the multiport telephonic switch 30 through the switch port 48. The double throw-switch section controller 62 causes both switch sections to change between their corresponding positions, simultaneously.

The optimum advantage is obtained from the invention when the single customer site 14' has at least two different signaling types of telephonic equipment: digital and analog, such as the illustrative analog telephone 64 and a digital meter reading device 66 at customer site 14'.

In accordance with the preferred telecommunication method of the present invention, the triple-pole, double-throw switch defined by switch elements 58, 60 and 62 is used to selectively, alternatively, couple the plurality of different line unit interfaces 52, 54 and 56 to a single one 20' of the plurality of telecommunication lines 20 to respectively enable communication via the different types of telecommunication signals to which the line unit interfaces 52, 54 and 56 are adapted on the single customer telecommunication line 20'. As previously noted, preferably this is performed with respect to all of the plurality of customer telecommunication lines.

The position of the switch is determined by the controller 62 which, in turn, responds to control signals from the switch control computer 32 provided at control input 44 of the switch controller 62. The switch control computer 32, in turn, has a control program that is responsive to messages received through at least one and preferably both the intermediate telephonic switches 26 of the network 10 and the computer internet 28, and to information initiated from the customer site to control to control the double-throw switch section controller 62.

Preferably, the switch section controller 62 is caused to automatically switch the telecommunication line 20' to a preselected default one of the plurality of different line unit interfaces 52, 54 and 56 in the absence of receipt of a control message, an access code or other conditions indicating that another one of the plurality of different line unit interfaces 52, 54 and 56 is to be selected.

Generally, in accordance with the invention, the preferred preselection of the default interface is the one that is used most often, and this should generally can be assumed to be service required by the customers voice telephone in the absence of other information. Thus, in the case of the exemplary customer site 14', in which both the analog telephone 64 and the digital meter reading device 66 are on the same line 20', the double-throw switch section controller 62 would be caused to switch the analog line interface 52 into the line 20' automatically when it is not receiving a signal to switch to one of the two other digital interfaces 54 and 56.

Also, preferably the customer line is automatically switched to preselected default one of the plurality of different line unit interfaces associated with the voice telephone when the telephone goes "off-hook" to originate a call from the customer line 20'. Calls initiated by customers equipment, although starting with the default preselected interface in response to call origination from the customer's line 20', are switched to another one of the interfaces in response to an access code from the customer's telephonic equipment. Alternatively, calls are switched automatically in response to an examination of the traffic. Upon receipt of the access code, the switch control computer 32 sends a control signal to the remotely controllable line multi-interface 42 to cause it to switch the customer line 20' from the default interface to another one of the interfaces associated with and identified by the access code.

If the call is initiated by the service provider, then in accordance with the invention, the signal code determines which interface to use. Alternatively, if the call is initiated by the end user, the default interface is used. Further alternatively, if the call is initiated by the CPE, then the signal code determines which interface to use.

Referring now to FIG. 4, the method starts at step 70. Then at step 72, the method signals the customer switch 62 (off hook, DN, port type). In step 74, the customer switch 62 changes port type. Then at step 76, the method signals the service provider that the connection is made. At step 78, the data is transmitted and the method then ends at step 80.

Those skilled in the art having the benefit of the present disclosure will appreciate that the present invention may take many forms and embodiments. Some embodiments have been presented and described so as to give an understanding of the invention, such as switching between digital or analog lines based on an examination of the traffic. It is intended that these embodiments should be illustrative and not limiting of the present invention. Rather, it is intended that the invention cover all modifications, equivalents and alternatives falling within the spirit and scope of the invention as defined by the appended claims.

What is claimed is:

1. In a telecommunications network having a local multiport switch for servicing a plurality of telecommunication lines, the improvement being a remotely controllable, line multi-interface, comprising:

a plurality of different line unit interfaces for interfacing different types of telecommunication signals;

means for selectively, alternatively, coupling one of the plurality of different line unit interfaces to at least a single one of the plurality of telecommunication lines to respectively enable communication via different types of telecommunication signals on the single one of the plurality of telecommunication lines;

means for automatically switching a default one of the plurality of different line unit interfaces to the single one of the plurality of telecommunication lines initially when a call is originated from the single one of the plurality of telecommunication lines; and means responsive to receipt of an access code from the single one of the plurality of telecommunication lines to switch the single one of the plurality of telecommunication lines from the default one of the plurality of different line unit interfaces to another one of the plurality of different line unit interfaces associated with the access code after the default one of the plurality of different line unit interfaces has been initially switched to the single one of the plurality of communication lines.

2. The telecommunication network of claim 1 in which the selectively coupling means includes means for selectively coupling the different line unit interfaces to each of the plurality of telecommunication lines.

3. The telecommunications network of claim 1 in which the plurality of different line unit interfaces includes an analog signal interface and a digital signal interface.

4. The telecommunications network of claim 1 in which the selectively coupling means includes a special line unit switch for electronically, alternatively, switching the single one of the plurality of telecommunication lines between the plurality of different line unit interfaces, and means at the multiport switch for controlling the special line unit switch via control messages sent to the multiport switch.

5. The telecommunications network of claim 4 in which the special line unit switch includes means for automatically switching the single one of the telecommunication lines to a default one of the plurality of different line unit interfaces in the absence of receipt of a control signal indicating that another one of the plurality of different line unit interfaces is to be selected.

6. The telecommunication network of claim 1 in which the selectively coupling means includes means for automatically coupling a default one of the plurality of different line unit interfaces whenever another one of the plurality of different interfaces is not affirmatively selected to be the interface for the single one of the plurality of telecommunication lines.

7. The telecommunication network of claim 1 in which the plurality of different line unit interfaces includes, at least one of: (a) an ISDN interface; (b) an XDSL interface; (c) an analogy interface; (d) an analog and digital interface; or (e) a T-1 interface.

8. The telecommunication network of claim 1 in which the plurality of different line unit interfaces includes an ISDN interface and a T1 interface.

9. The telecommunication network of claim 1 in which the plurality of different line unit interfaces includes an ISDN interface and a PRI interface.

10. In a telecommunications network having a local multiport switch for servicing a plurality of telecommunication lines, the improvement being a method of telecommunication, comprising the steps of:

providing for use by at least one of the plurality of telecommunication lines a plurality of different line unit interfaces for interfacing different types of telecommunication signals;

selectively, alternatively, coupling the plurality of different line unit interfaces to the at least one of the plurality of telecommunication lines to respectively enable communication via the different types of telecommunication signals on the at least one of the plurality of telecommunication lines; and wherein the plurality of different line unit interfaces includes an analog signal interface and a digital signal interface and includes the steps of;

automatically coupling a default one of the plurality of different line unit interfaces whenever another one of the plurality of different interfaces is not affirmatively selected to be the interface for the single one of the plurality of telecommunication lines;

automatically switching said default one of the plurality of different line unit interfaces to the at least one of the plurality of telecommunication lines initially when a call is originated from the at least one of the plurality of telecommunication lines; and responding to receipt of an access code from the at least one of the plurality of telecommunication lines to switch the at least one of the plurality of telecommunication lines from the default one of the plurality of different line unit interfaces to another one of the plurality of different line unit interfaces after the default one of the plurality of different line unit interfaces has been initially switched to the at least one of the plurality of communication lines.

11. The method of claim 10 in which the step of selectively coupling includes the step of selectively, alternatively, coupling the different line unit interfaces to each of the plurality of the telecommunication lines.

12. The telecommunications network of claim 10 in which the step of selectively coupling includes the steps of electronically switching the single one of the plurality of telecommunication lines between the plurality of different line unit interfaces, and controlling the special line unit switch in response to control messages received by the multiport switch.

13. The of method of claim 12 in which the step of switching includes the step of automatically switching the single one of the telecommunication lines to a default one of the plurality of different line unit interfaces in the absence of receipt of a control message indicating that another one of the plurality of different line unit interfaces is to be selected.

14. The method of claim 10 in which the plurality of different line unit interfaces includes at least one of: (a) an ISDN interface; (b) a XDSL interface; (c) an analog interface; (d) an analog and digital interface; or (e) a T-1 interface.

* * * * *